United States Patent
Otaka et al.

(10) Patent No.: US 12,028,648 B2
(45) Date of Patent: Jul. 2, 2024

(54) INFORMATION PROCESSING APPARATUS, INFORMATION PROCESSING METHOD THEREFOR, AND COMPUTER-READABLE STORAGE MEDIUM

(71) Applicant: HONDA MOTOR CO., LTD., Tokyo (JP)

(72) Inventors: Masaru Otaka, Tokyo (JP); Takahiro Yoshimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/384,880

(22) Filed: Jul. 26, 2021

(65) Prior Publication Data
US 2022/0060657 A1    Feb. 24, 2022

(30) Foreign Application Priority Data

Aug. 20, 2020 (JP) ................. 2020-139434

(51) Int. Cl.
*H04N 7/04* (2006.01)
*G06T 3/4038* (2024.01)
(Continued)

(52) U.S. Cl.
CPC ............. *H04N 7/04* (2013.01); *G06T 3/4038* (2013.01); *G06T 11/00* (2013.01); *H04W 4/46* (2018.02);
(Continued)

(58) Field of Classification Search
CPC .. H04N 7/04; H04N 21/4223; H04N 21/4316; H04N 21/44245; H04N 21/4784;
(Continued)

(56) References Cited

U.S. PATENT DOCUMENTS 8,885,610 B2    11/2014 Yokota
9,141,112 B1 *   9/2015 Loo .................. G08G 1/096838
(Continued)

FOREIGN PATENT DOCUMENTS

CN    110519555 A    11/2019
CN    110581981 A    12/2019
(Continued)

OTHER PUBLICATIONS

Chinese Office Action for Chinese Patent Application No. 202110806919.X mailed May 6, 2023.
(Continued)

*Primary Examiner* — Tung T Vo
(74) *Attorney, Agent, or Firm* — Thomas| Horstemeyer, LLP

(57) ABSTRACT

An information processing apparatus, the information processing apparatus executing an information processing method comprising: receiving a request of image data from an external terminal; specifying, based on the request, a vehicle that provides image capturing data to generate the image data; specifying a parameter concerning a communication path to be used by the specified vehicle to transmit the image capturing data to the information processing apparatus; and transmitting the specified parameter to the specified vehicle.

14 Claims, 10 Drawing Sheets

(51) Int. Cl.
*G06T 11/00* (2006.01)
*H04W 4/46* (2018.01)
*H04W 8/18* (2009.01)
*H04W 84/04* (2009.01)
*G05D 1/00* (2006.01)

(52) U.S. Cl.
CPC ............ *H04W 8/18* (2013.01); *G05D 1/0231* (2013.01); *H04W 84/042* (2013.01)

(58) Field of Classification Search
CPC .. H04N 21/812; H04N 21/41422; H04N 7/18; H04N 7/181; H04N 21/4318; H04N 23/661; G06T 3/4038; G06T 11/00; H04W 4/46; H04W 8/18; H04W 84/042; H04W 4/029; H04W 4/44; H04W 40/02; G05D 1/0231; G06Q 30/0266; G06Q 50/30; G06V 20/58; G08G 1/0112; G08G 1/0141; G08G 1/04
USPC ......................................................... 348/148
See application file for complete search history.

(56) References Cited

U.S. PATENT DOCUMENTS

| | | | |
|---|---|---|---|
| 9,143,384 B2 * | 9/2015 | Yousefi | H04N 19/102 |
| 10,785,454 B2 * | 9/2020 | Katayama | G06V 10/95 |
| 10,943,135 B2 | 3/2021 | Nishimura et al. | |
| 2010/0254307 A1 | 10/2010 | Yokota | |
| 2016/0069703 A1 * | 3/2016 | Nakano | G01C 21/3667 |
| | | | 701/428 |
| 2019/0266424 A1 | 8/2019 | Nishimura et al. | |
| 2019/0364248 A1 | 11/2019 | Katayama et al. | |
| 2020/0051427 A1 * | 2/2020 | Katayama | G06V 20/58 |
| 2020/0234582 A1 * | 7/2020 | Mintz | G08G 1/096811 |
| 2020/0344634 A1 * | 10/2020 | Hayashida | H04W 4/44 |
| 2021/0150233 A1 | 5/2021 | Nishimura et al. | |
| 2021/0272157 A1 * | 9/2021 | Otaka | H04W 4/23 |
| 2021/0297341 A1 * | 9/2021 | Achouri | H04W 4/44 |
| 2021/0350159 A1 * | 11/2021 | Kanzawa | G06V 10/10 |
| 2022/0203985 A1 * | 6/2022 | Yashiro | B60W 30/18109 |
| 2022/0217558 A1 * | 7/2022 | Piriou | G06N 3/08 |

FOREIGN PATENT DOCUMENTS

| | | |
|---|---|---|
| JP | 2002236632 A | 8/2002 |
| JP | 2003317193 A | 11/2003 |
| JP | 2004064375 A | 2/2004 |
| JP | 2007266989 A | 10/2007 |
| JP | 4048818 B2 | 2/2008 |
| JP | 2011101409 A | 5/2011 |
| JP | 2012191443 A | 10/2012 |
| JP | 2014-191664 A | 10/2014 |
| JP | 2015061274 A | 3/2015 |
| JP | 2016063337 A | 4/2016 |
| JP | 2019096934 A | 6/2019 |
| JP | 2019149016 A | 9/2019 |

OTHER PUBLICATIONS

Japanese Office Action for Japanese Patent Application No. 2020139434 mailed Dec. 1, 2023.

\* cited by examiner

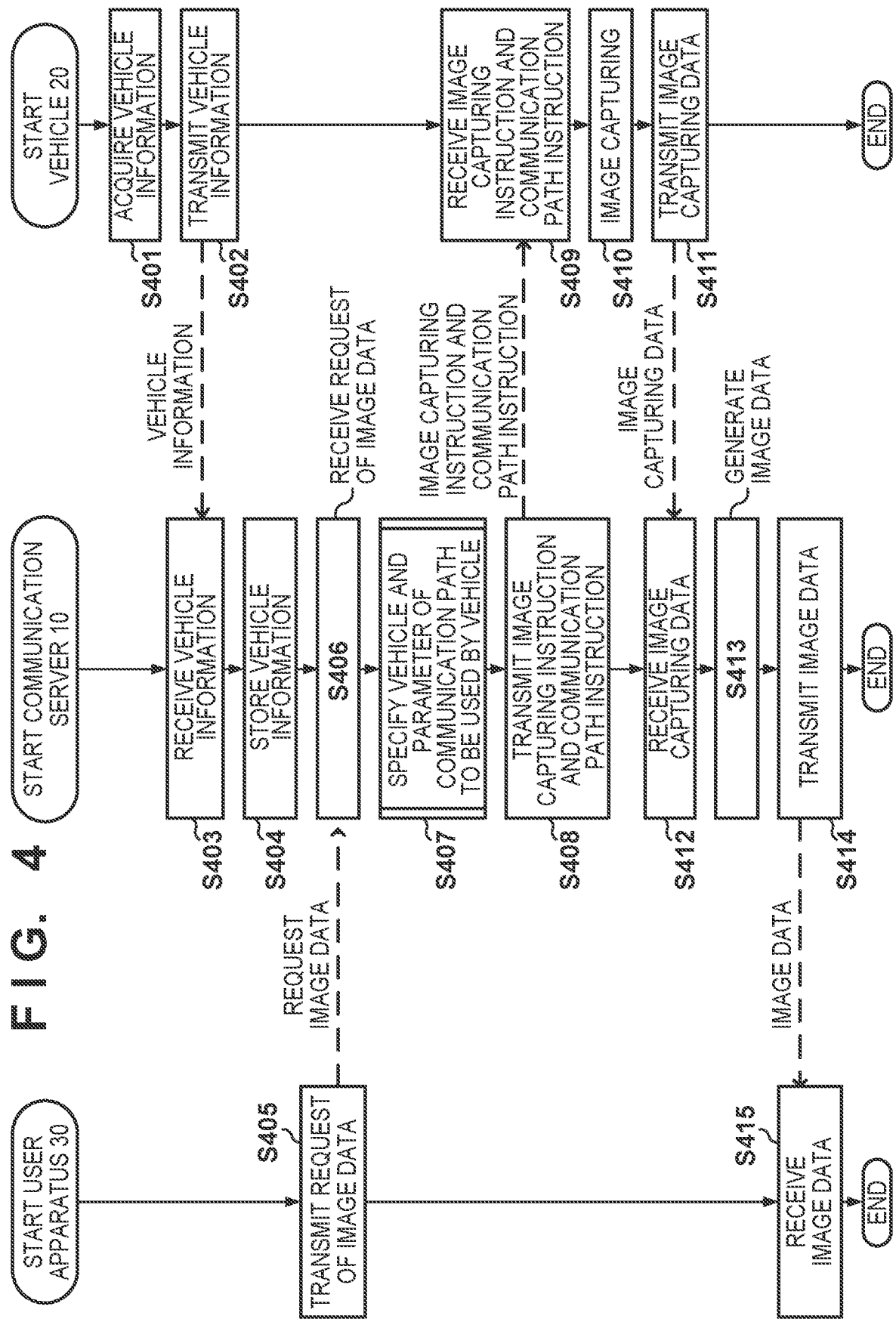

FIG. 5
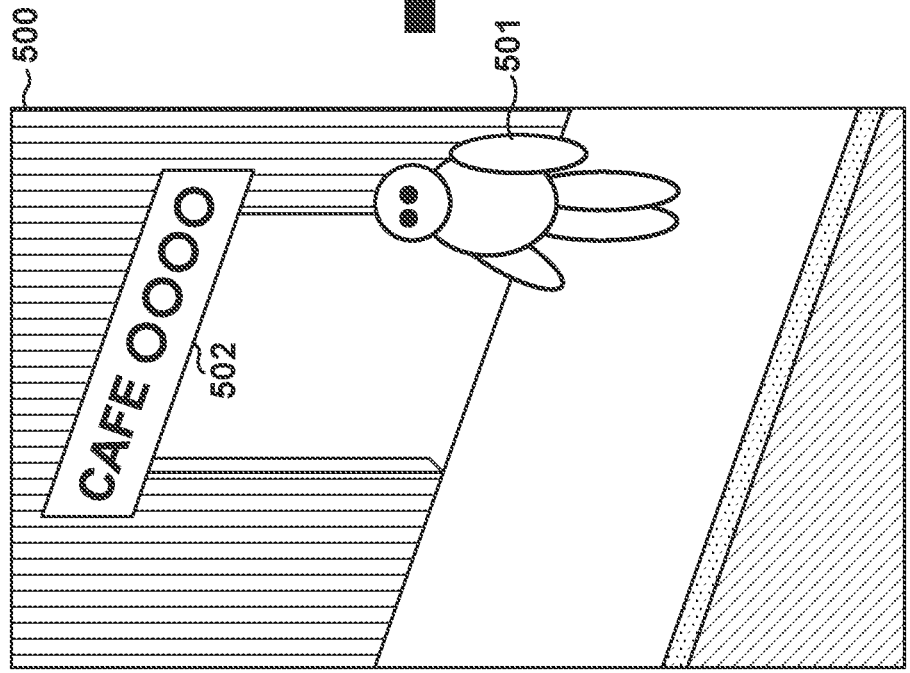
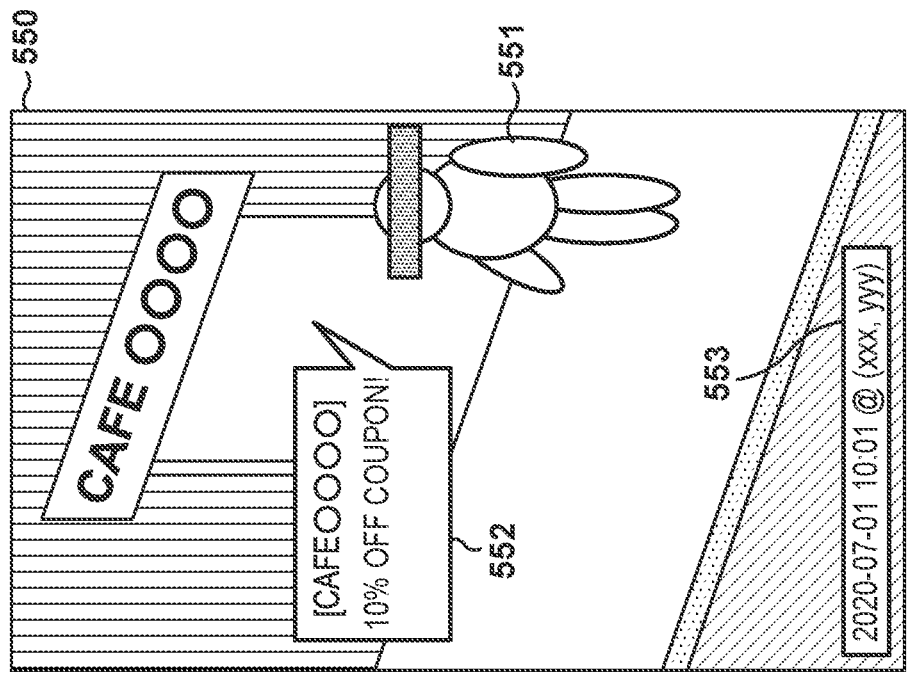

FIG. 7A

| USER IDENTIFIER | USER TYPE |
|---|---|
| 1 | Non-charging |
| 2 | Charging |
| ⋮ | ⋮ |
| N | Non-charging |

FIG. 7B

| VEHICLE IDENTIFIER | POSITION INFORMATION | COMMUNICATION PATH INFORMATION |
|---|---|---|
| 1 | (x1, y1) | UNDER CONNECTION (Wi-Fi: SSID = Free-xxx, RSSI = -72) |
| 2 | (x2, y2) | NON-CONNECTED |
| ... | ... | ... |
| N | (xN, yN) | UNDER CONNECTION (V2V. Object ID = vvvv, RSSI = -66) CONNECTABLE (V2V. Object ID = eeee, RSSI = -74, Wi-Fi: SSID = iiii, RSSI = -77) |

711 — 712 — 713 — 710

INFORMATION PROCESSING APPARATUS, INFORMATION PROCESSING METHOD THEREFOR, AND COMPUTER-READABLE STORAGE MEDIUM

CROSS-REFERENCE TO RELATED APPLICATION(S)

This application claims priority to and the benefit of Japanese Patent Application No. 2020-139434 filed on Aug. 20, 2020, the entire disclosure of which is incorporated herein by reference.

BACKGROUND OF THE INVENTION

Field of the Invention

The present invention relates to an information processing apparatus, an information processing method therefor, and a computer-readable storage medium.

Description of the Related Art

There is known a technique in which an external information terminal acquires, via a network, image capturing data from an image capturing device mounted on a vehicle. Japanese Patent No. 4048818 discloses an information communication apparatus that transmits, when it is determined that there is an image capturing point on the moving path of a vehicle, image capturing instruction data to the vehicle.

A vehicle may be communicable with an information communication apparatus by a plurality of communication paths. In this case, it may be desirable to set a communication path to be used by the vehicle to transmit image capturing data from the viewpoint of the cost of using the communication path, the communication quality and delay of the communication path, and the like.

SUMMARY OF THE INVENTION

The present invention has been made in consideration of the above problem, and provides a mechanism for setting a communication path to be used by a vehicle to transmit image capturing data to an information processing apparatus.

An information processing apparatus according to the present invention is an information processing apparatus, the information processing apparatus executing an information processing method comprising: receiving a request of image data from an external terminal; specifying, based on the request, a vehicle that provides image capturing data to generate the image data; specifying a parameter concerning a communication path to be used by the specified vehicle to transmit the image capturing data to the information processing apparatus; and transmitting the specified parameter to the specified vehicle.

BRIEF DESCRIPTION OF THE DRAWINGS

FIG. 4 is a sequence chart showing an example of processing of the communication system according to the first embodiment;
FIG. 5 is a view showing examples of image capturing data and image data according to the first embodiment;
FIG. 7A is a table showing an example of user information held by the communication server according to the first embodiment;
FIG. 7B is a table showing an example of vehicle information held by the communication server according to the first embodiment.

DESCRIPTION OF THE EMBODIMENTS

Figure 1:
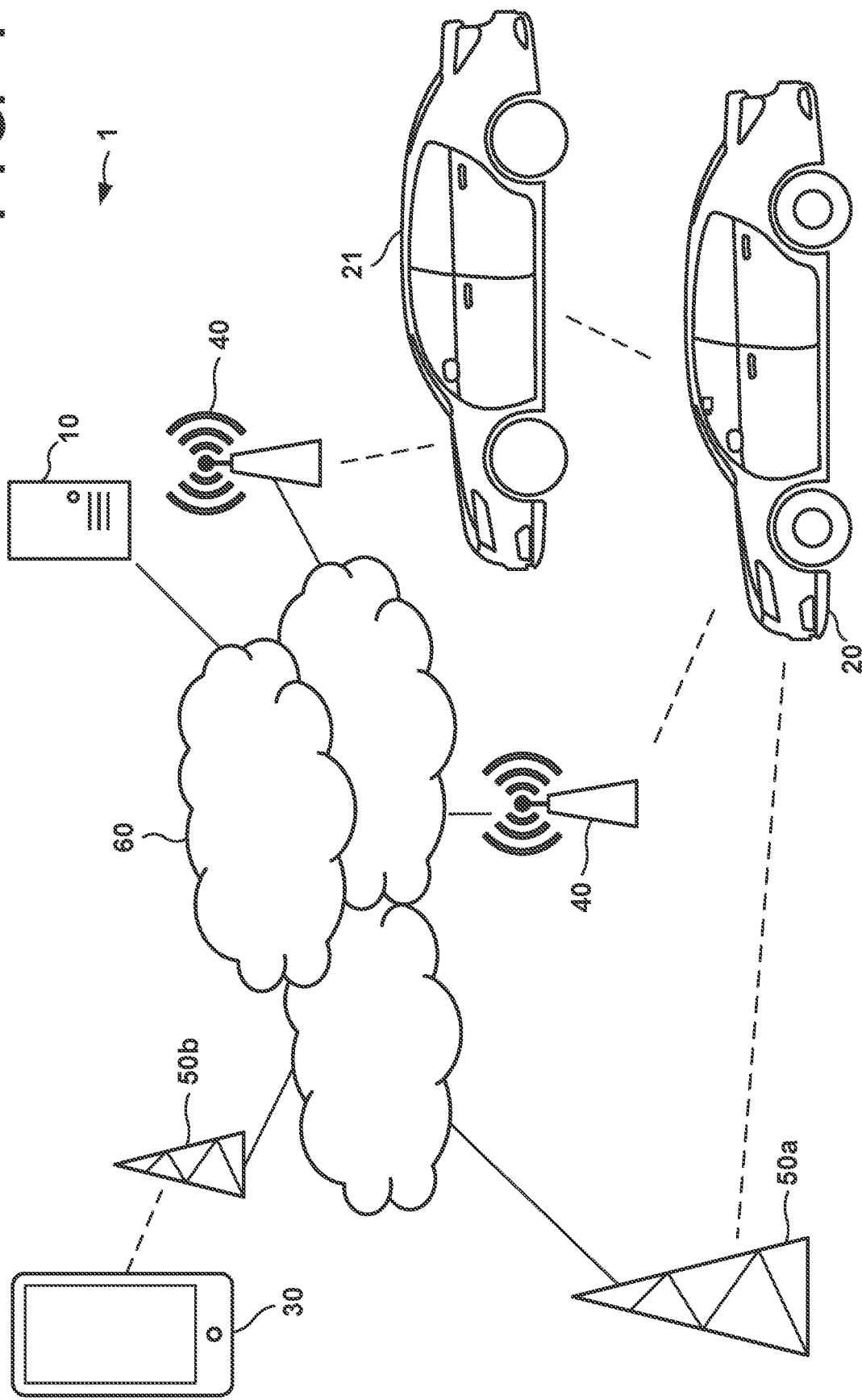
FIG. 1 is a schematic view of a communication system according to the first embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

System Configuration

FIG. 1 is a schematic view of a communication system according to an embodiment of the present invention. A communication system 1 includes a communication server 10 and a vehicle 20. FIG. 1 shows a user apparatus 30, an access point (AP) 40, and base stations 50a and 50b (to collectively be referred to as base stations 50 hereinafter) in addition to the communication system 1.

The communication server 10 can mutually communicate with the vehicle 20 and the user apparatus 30 via a network including at least one of a cellular network and a wireless local area network (WLAN).

The communication server 10 is an information processing apparatus that instructs, in response to a request from the user apparatus 30, the vehicle 20 managed by the communication server 10 to perform image capturing. Upon receiving the image capturing instruction, the vehicle 20 acquires, from an image capturing device provided in the vehicle, image capturing data outside the vehicle, and provides the image capturing data to the communication server 10. The communication server 10 provides image data to the user apparatus 30 based on the image capturing data outside the vehicle. This allows the user of the user apparatus 30 to confirm an image at a predetermined point in real time. In one example, the communication server 10 includes one or more servers (information processing apparatuses) on the Internet. The communication server 10 according to this embodiment transmits an image capturing instruction for instructing the vehicle 20 to perform image capturing and a parameter concerning a communication path to be used by the vehicle 20 to transmit the image capturing data.

The vehicle 20 is managed by the communication server 10 according to this embodiment, and accepts an image capturing instruction from the communication server 10 to provide image capturing data. This embodiment assumes that the vehicle 20 is connected to a WLAN network formed by the AP 40. In one example, the vehicle 20 may join a multi-hop network in which the AP 40 serves as a gateway, and transmit data to the AP 40 by multi-hop via another vehicle such as a vehicle 21 or another infrastructure.

Furthermore, the vehicle 20 can also communicate with the base stations 50 of a wide area network such as a cellular network. The AP 40 is a communication apparatus that forms a WLAN as an example of a local area network. In this embodiment, the base stations 50a and 50b are communication apparatuses that form a cellular network as an example of a wide area network. This embodiment assumes that the WLAN network has a coverage narrower than that of the cellular network.

Note that the AP 40 and the base station 50 are examples of communication apparatuses that form a plurality of networks which the vehicle 20 can join and have different coverages, and do not limit the kinds of formed networks. For example, the AP 40 may be an access point that forms a local area network (WLAN) including at least one of a single-hop WLAN and a multi-hop WLAN. The single-hop WLAN includes a Wi-Fi® network complying with the Wi-Fi® standard. The multi-hop WLAN includes at least one of a Wi-Fi® network complying with the Wi-Fi® standard and networks complying with the C-V2X (Cellular Vehicle-to-Everything) standard, DSRC (Dedicated Short Range Communication) standard, and IEEE802.11p V2X standard. The base station 50 may be a base station for cellular communication of one of a macrocell, microcell, picocell, and femtocell, or a base station for satellite communication.

The user apparatus 30 is an information processing apparatus such as a PC, tablet, or smartphone operated by the user who receives an image data providing service provided by the communication system 1, and is an example of an external terminal that receives the image data providing service. FIG. 1 shows a state in which the user apparatus 30 is connected to the Internet via the base station 50b but the user apparatus 30 may be connected to the Internet via an access point which is the same as or different from the AP 40.

Hardware Arrangement

Figure 2A:
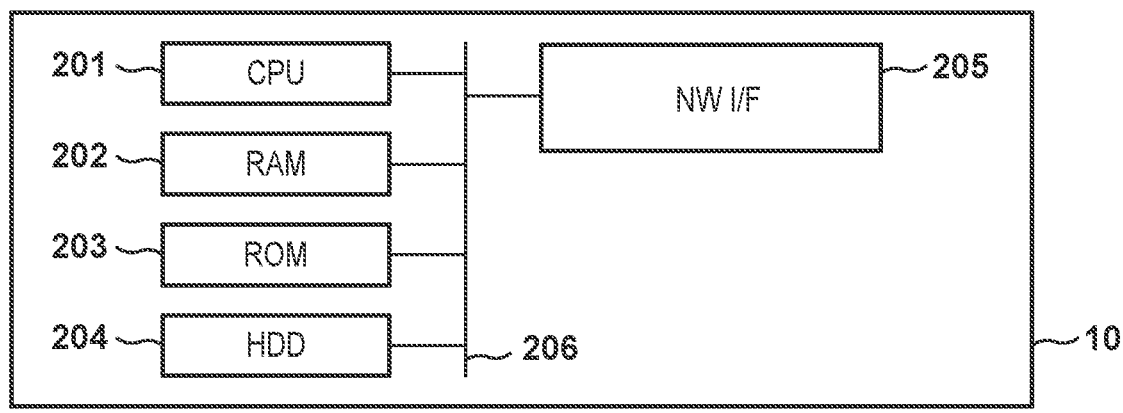
FIG. 2A is a hardware block diagram of a communication server according to the first embodiment.

The hardware arrangement of the communication server 10 will be described with reference to FIG. 2A.

The communication server 10 includes a CPU (Central Processing Unit) 201, a RAM (Random Access Memory) 202, a ROM (Read Only Memory) 203, an HDD (Hard Disk Drive) 204, and a network interface (NW I/F) 205. The respective portions are communicably connected to each other via an internal bus 206.

The CPU 201 controls the overall processing of the communication server 10. The RAM 202 is a volatile storage area, and is used as the work memory of the CPU 201 and the like. The ROM 203 is a nonvolatile storage area, and holds various programs to be executed by the CPU 201 and data. The HDD 204 is a nonvolatile storage area, and holds various data. The NW I/F 205 controls communication with an external apparatus via an external network (for example, the Internet 60), and transmits/receives various data. The communication method here is not limited to a wired/wireless communication method and wired and wireless communication methods may be combined.

Figure 2B:
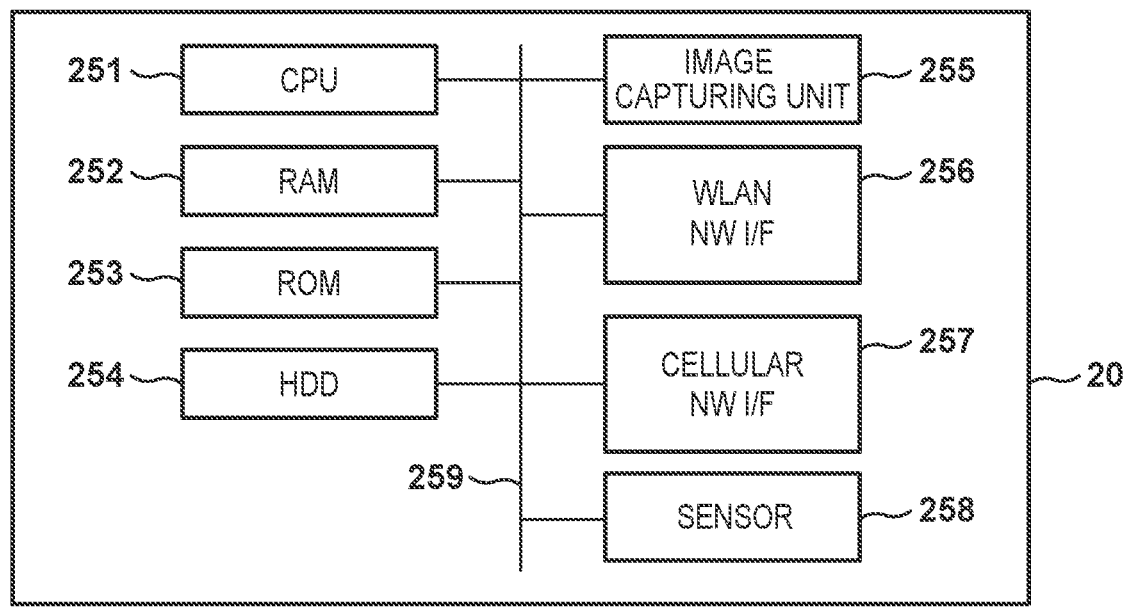
FIG. 2B is a hardware block diagram of a vehicle according to the first embodiment.

The hardware arrangement of the vehicle 20 will be described with reference to FIG. 2B. Note that only hardware components associated with the image data providing service according to this embodiment will be described with reference to FIG. 2B and a description of components such as the driving unit of the vehicle 20 will be omitted.

The vehicle 20 includes a CPU 251, a RAM 252, a ROM 253, an HDD 254, an image capturing unit 255, a WLAN NW IF 256, a cellular NW IF 257, and a sensor 258. The respective portions are communicably connected to each other via an internal bus 259. The CPU 251 controls the overall processing of the vehicle 20. The RAM 252 is a volatile storage area, and is used as the work memory of the CPU 251 and the like. The ROM 253 is a nonvolatile storage area, and holds various programs to be executed by the CPU 251 and data. The HDD 254 is a nonvolatile storage area, and holds various data.

The image capturing unit 255 is an image capturing device including at least one of the camera of a drive recorder arranged in the vehicle 20, a front camera, a rear camera, and a side camera. The image capturing unit 255 may include a camera for automated driving or the camera of a portable terminal communicable with the vehicle.

The WLAN NW IF 256 is a communication unit capable of joining the wireless local area network (WLAN) formed by the AP 40. The WLAN NW IF 256 is an example of a NW IF for connection to the local area network described above. The cellular NW IF 257 is a communication unit communicable with the base station 50 of the wide area network described above.

Software Arrangement

Figure 3A:
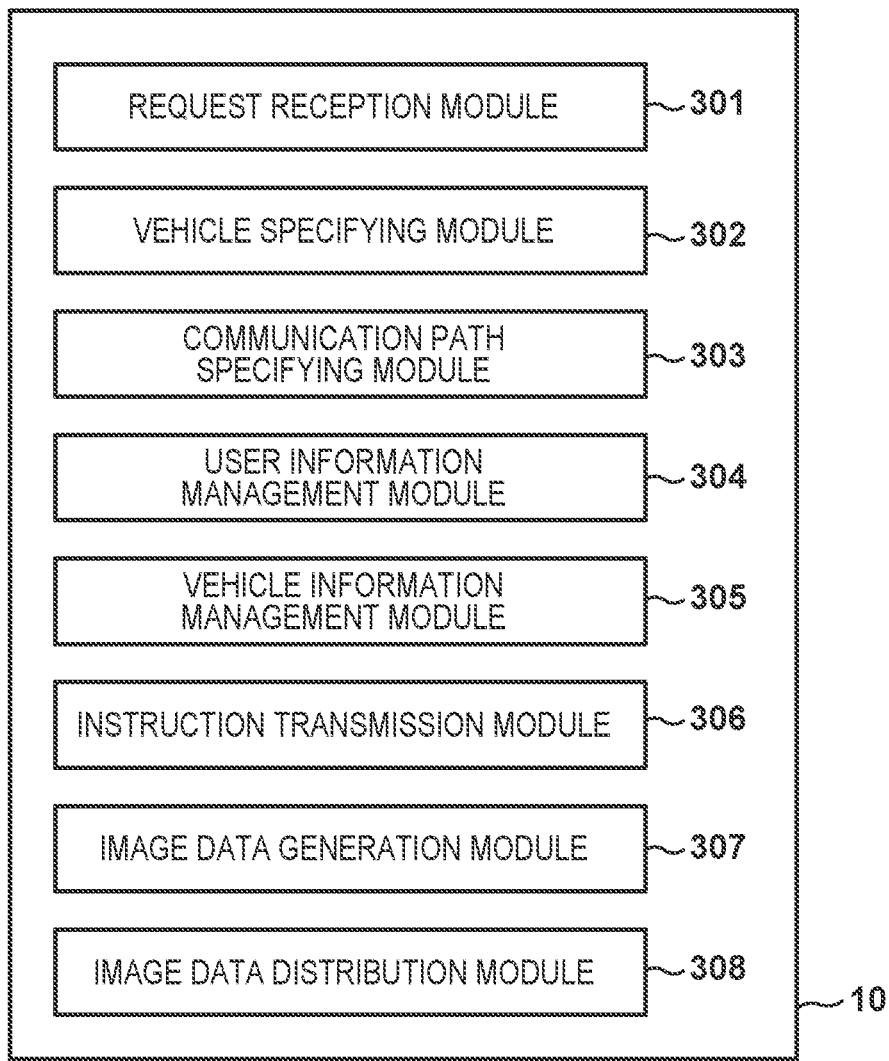
FIG. 3A is a software block diagram of the communication server according to the first embodiment.

The software arrangement of the communication server 10 will be described with reference to FIG. 3A. The communication server 10 implements functions shown in FIG. 3A when the CPU 201 controls the NW IF 205 by executing the program stored in at least one of the ROM 203 and the HDD 204.

The communication server 10 includes a request reception module 301, a vehicle specifying module 302, a communication path specifying module 303, a user information management module 304, a vehicle information management module 305, an instruction transmission module 306, an image data generation module 307, and an image data distribution module 308.

The request reception module 301 receives a request (sharing request) of image data from the user apparatus 30 operated by the user. For example, if the user apparatus 30 accepts, from the user, an operation of requesting a peripheral image of a predetermined point, it transmits a request of image data to the communication server 10. In this case, the request of image data includes information capable of specifying the predetermined point. In another example, if the user apparatus 30 accepts, from the user, an operation of requesting a peripheral image captured from a predetermined vehicle, it transmits a request of image data to the communication server 10. In this case, the request of image data includes information (for example, a vehicle identifier) capable of specifying the predetermined vehicle. The sharing request may include the identifier of the user who requests the image data.

An example of user information 700 held by the communication server 10 will now be described with reference to FIG. 7A. The user information includes a user identifier 701 and a user type 702. The user identifier 701 is an example of information capable of identifying the user who operates the user apparatus. For example, the user identifier 701 may be a user account. The user type 702 corresponds to account information such as the user type of the user who operates the user apparatus 30. For example, the user type 702 may be information indicating whether the user is a free member or a paid member. In the example shown in FIG. 7A, "Non-charging" indicating a free member or "Charging" indicating a paid member is set. In one example, the user information 700 may additionally include an email address of the user and a password for user authentication.

The vehicle specifying module 302 determines, based on the request of image data received from the user apparatus 30, among vehicles whose vehicle information is held by the communication server 10, a vehicle to which an image capturing instruction (to be described later) is to be transmitted.

An example of vehicle information 710 held by the communication server 10 will now be described with reference to FIG. 7B. The vehicle information 710 includes a vehicle identifier 711, position information 712, and communication path information 713.

The vehicle identifier 711 is an example of information capable of identifying a vehicle. The position information 712 is information concerning a position at which the vehicle is currently located, and is, for example, current position information of the vehicle acquired from a GPS (Global Positioning System) sensor provided in the vehicle. In one example, the position information 712 may include information concerning the current posture of the vehicle such as a value acquired from a geomagnetic sensor.

The communication path information 713 is information (network information) capable of specifying at least one of a communication path usable by the vehicle and a currently used communication path. Referring to FIG. 7B, the communication path information 713 of a vehicle having "1" as the vehicle identifier 711 and existing at a position (x1, y1) is "under connection (Wi-Fi: SSID=Free-xxx, RSSI=−72)". The communication path information "under connection (Wi-Fi: SSID=Free-xxx, RSSI=−72)" indicates that the vehicle is currently connected to the Wi-Fi network, the service set identifier (SSID) of the connected WLAN is "Free-xxx", and the reception signal intensity (RSSI) from the AP is −72 dB. That is, the communication path information 713 may include, as information concerning a communication path in use, the SSID (Service Set ID) of the currently connected AP. Note that a description will be provided by assuming that the vehicle 20 according to this embodiment is located within the service area of the cellular network and the communication server 10 does not manage information indicating whether the vehicle 20 is currently connected to the cellular network. However, the communication server 10 may manage, as the communication path information 713, information concerning the wide area network such as the cellular network connected to the vehicle 20.

Furthermore, the communication path information 713 may include information concerning a connectable communication path in addition to information concerning the currently connected network. For example, the communication path information 713 of a vehicle having "N" as the vehicle identifier 711 includes information indicating that the vehicle is connected to another vehicle having "vvvv" as the vehicle identifier by vehicle-to-vehicle communication (V2V). Furthermore, the communication path information 713 includes information indicating that the vehicle having "N" as the vehicle identifier 711 detects, as another switchable communication path, vehicle-to-vehicle communication (V2V) in which the vehicle ID is "eeee" or a WLAN in which the SSID is "iiii". The information concerning the switchable communication path may further include information indicating the communication quality of the communication path, for example, the reception signal intensity indicator (RSSI) in association with the detected communication path. Note that the information indicating the communication quality of the communication path may include at least one of the RSSI, packet error rate, transmission delay, and throughput.

Furthermore, for example, the communication path information 713 may include information concerning the fact that the vehicle includes a transmission/reception circuit, that is, a usable wireless standard. For example, the communication path information 713 may be information capable of specifying a communication standard and a wireless frequency, such as "802.11n (2.4G)" or "802.11a (5G)". The communication path information 713 may include information concerning a communication path usable at the current time. For example, the communication path information 713 may include a list of APs including the SSIDs of the APs acquired as a result of scanning a predetermined frequency band by the WLAN NW IF 256. In this case, the list of the APs may include information concerning the communication quality such as a signal intensity from each AP.

Furthermore, for example, the communication path information 713 may include information concerning the encryption method of WLAN wireless communication.

Note that in one example, the vehicle information 710 may additionally include information concerning at least one of the type of the image capturing device provided in the vehicle, the type of the vehicle, the state of the vehicle indicating whether the vehicle is traveling or stops, and the owner of the vehicle.

If the request of image data includes vehicle information capable of specifying a vehicle, the vehicle specifying module 302 specifies the vehicle having the vehicle identifier 711 corresponding to the vehicle information. If, for example, the request of image data includes position information capable of specifying a position, the vehicle specifying module 302 compares the position information included in the request of image data with the position information 712, and specifies the vehicle identifier 711 of a vehicle located within a predetermined distance.

The communication path specifying module 303 specifies a communication path to be used by the vehicle specified by the vehicle specifying module 302 to transmit image capturing data. Processing of the communication path specifying module 303 will be described later. For example, if it is determined that the vehicle 20 can use communication via the WLAN, the communication server 10 acquires image capturing data from the vehicle 20 via the WLAN. Since this eliminates the need to use the cellular network, it is possible to reduce the communication cost and acquire image capturing data without pressing the band of the cellular network.

Alternatively, the communication path specifying module 303 may determine a communication path to be used by the vehicle to transmit image capturing data in consideration of the user type 702 of the user information 700. This makes it possible to determine to provide, in response to a request of image capturing data received from a charging user, the image capturing data to the vehicle 20 with a delay as low as possible since at least one of the WLAN and the cellular network may be used, and to provide, in response to a request of image capturing data received from a non-charging user, the image capturing data to the vehicle 20 at a cost as low as possible by using the WLAN network.

The user information management module 304 manages the information, described with reference to FIG. 7A, concerning the user who receives a browsing service of image capturing data captured by the image capturing unit 255 provided in the vehicle.

The vehicle information management module 305 manages information, described with reference to FIG. 7B, concerning a vehicle that includes the image capturing unit 255 and can provide image capturing data.

Upon accepting the request of image data from the user apparatus, the instruction transmission module 306 transmits an image capturing instruction to the vehicle specified by the vehicle specifying module 302. In addition, the instruction transmission module 306 transmits an instruction concerning a communication path to the vehicle specified by the vehicle specifying module 302 to use the communication path specified by the communication path specifying module 303. Note that the image capturing instruction and the instruction concerning the communication path may be transmitted by the same packet.

The image data generation module 307 generates image data (to be described later) based on the image capturing data received from the vehicle 20 via the NW IF 205. The image data distribution module 308 transmits, to the user apparatus 30 that has transmitted the request of image data, the image data generated by the image data generation module 307 based on the image capturing data.

Figure 3B:
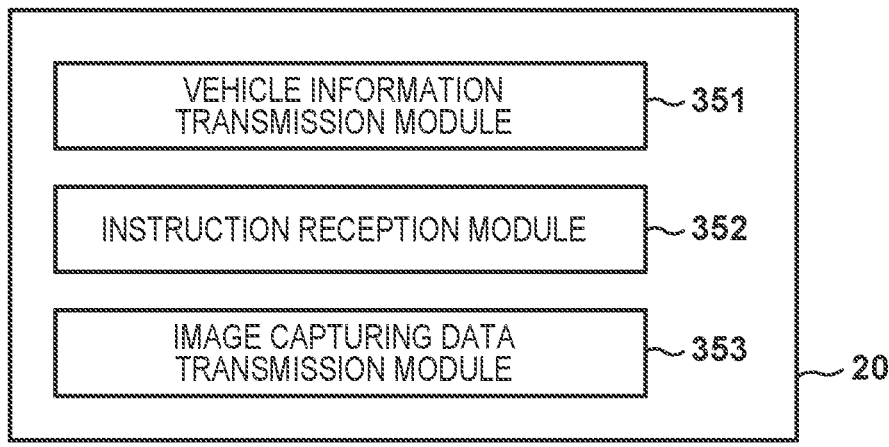
FIG. 3B is a software block diagram of the vehicle according to the first embodiment.

The software arrangement of the vehicle 20 according to this embodiment will be described with reference to FIG. 3B. The vehicle 20 implements functions shown in FIG. 3B when the CPU 251 controls the WLAN NW IF 256 and the cellular NW IF 257 by executing the program stored in at least one of the ROM 253 and the HDD 254.

The vehicle 20 includes a vehicle information transmission module 351, an instruction reception module 352, and an image capturing data transmission module 353.

The vehicle information transmission module 351 transmits, to the communication server 10, vehicle information including at least one of position information concerning the current position of the vehicle 20 and communication path information concerning a communication environment in association with the identifier of the vehicle 20. For example, the vehicle information transmission module 351 transmits, to the communication server 10, as position information, position information acquired from the GPS sensor of the sensor 258 at a predetermined time interval. The vehicle information transmission module 351 transmits, as communication path information, information concerning a node joining the currently connected network and including at least one of the currently connected AP 40, the base station 50, and the node of vehicle-to-vehicle communication, for example, a service identifier (SSID) and a MAC address. Furthermore, in one example, the vehicle information transmission module 351 transmits information concerning a node joining a connectable network and including at least one of the connectable AP 40, the base station 50, and the node of vehicle-to-vehicle communication scanned by the WLAN NW IF 256 and the cellular NW IF 257. For example, the vehicle information transmitted by the vehicle information transmission module 351 is used by the vehicle information management module 305 of the communication server 10 to update the vehicle information.

The instruction reception module 352 receives the image capturing instruction and the communication path instruction from the communication server 10. Upon receiving the image capturing instruction, the instruction reception module 352 controls the image capturing unit 255 to acquire image capturing data using at least one of the image capturing devices provided in the vehicle 20. Upon receiving the communication path instruction, the instruction reception module 352 sets a communication path to be used by the image capturing data transmission module 353 to transmit the image capturing data.

The image capturing data transmission module 353 transmits the image capturing data generated by the image capturing unit 255 to the communication server 10 by the communication path based on the communication path instruction from the communication server 10.

Processing Sequence

An example of the processing of the communication system according to this embodiment will be described with reference to FIG. 4.

First, the vehicle 20 acquires the vehicle information including at least one of the position information of the vehicle 20 and the communication path information at a predetermined time period (S401), and transmits it to the communication server 10 (S402 and S403). This embodiment assumes that the vehicle 20 transmits at least one of the position information and the communication path information at the predetermined time period. However, if a predetermined condition is satisfied, for example, if the vehicle 20 moves by a predetermined distance or the AP connected to the local area NW IF 256 of the vehicle 20 changes, the vehicle information transmission module 351 may transmit at least one of the position information and the communication path information. Furthermore, the vehicle 20 may transmit at least one of the position information of the vehicle 20 and the communication path information to the communication server 10 under the condition that a request of vehicle information is accepted from the communication server 10.

Subsequently, the communication server 10 updates the vehicle information of the communication server 10 based on the vehicle information received in S403 (S404). For example, the communication server 10 updates the position information 712 of the vehicle information 710 held by the communication server 10 based on the position information received in S403. Alternatively, the communication server 10 updates the communication path information 713 included in the vehicle information 710 held by the communication server 10 based on the communication path information received in S403.

The user apparatus 30 requests the communication server 10 to provide image data (S405 and S406). The request of image data includes information for designating at least one of a vehicle and a point corresponding to the image data, as described above.

Upon receiving the request of image data in S406, the communication server 10 determines, based on the request of image data in S406, a vehicle to which an image capturing instruction is to be transmitted and a communication path to be used by the vehicle, which receives the image capturing instruction, to transmit image capturing data (S407).

For example, if the request of image data in S405 includes information for designating a predetermined vehicle, it is possible to specify the predetermined vehicle based on the vehicle identifier 711 of the vehicle information 710 held by the communication server 10. Alternatively, if the request of image data in S405 includes information for designating a predetermined point, it is possible to specify, based on the position information 712 of the vehicle information 710, a vehicle located at a position closest to the predetermined point.

Subsequently, the communication server 10 determines a communication path via which the specified vehicle is made to transmit image data. If, for example, the vehicle 20 transmits the image data via the cellular NW IF 257, it is possible to perform communication with a wide coverage, as compared with communication via the WLAN NW IF 256. However, this communication path is a communication path of a high cost, as compared with a communication path of a local area network. On the other hand, in communication via the WLAN NW IF 256, the vehicle 20 can perform communication at a low cost of a communication line but the coverage is narrow. Therefore, it may be determined that if the vehicle 20 has already been connected to the AP 40 via the WLAN NW IF 256, the vehicle 20 is made to transmit image data via the WLAN, and if the vehicle 20 cannot be connected to the AP 40 via the WLAN NW IF 256, the vehicle 20 is made to transmit image data via the cellular NW IF 257. If the vehicle 20 is not connected to the AP 40 and there exists the connectable AP 40, it may be determined to cause the vehicle 20 to be connected to the AP 40. Even if the vehicle 20 is connected to the AP 40, if there exists another connectable AP 40 of better communication quality, it may be determined to switch the communication path of the vehicle 20. This can cause the vehicle 20 to transmit image data with a low delay while suppressing the communication cost.

In one example, a communication path to be used by the vehicle may be determined in S407 based on the identifier of the user who has transmitted the request of image data. If, for example, the request of image data is accepted from a charging member, which of the WLAN NW IF 256 and the cellular NW IF 257 is used to transmit image data is determined. If the request of image data is accepted from a non-charging member, it is determined to transmit image data via the WLAN NW IF 256. This can provide the image data to the charging member with a low delay at all the time, and also provide the image data to the non-charging member at a low cost.

Subsequently, the communication server 10 transmits an image capturing instruction and a communication path instruction to the specified vehicle 20 (S408 and S409). Note that the image capturing instruction and the communication path instruction may be transmitted in S408 and S409 via the cellular network or the WLAN.

For example, the image capturing instruction may include information for instructing a direction from the vehicle 20 in which image capturing is performed. For example, the image capturing instruction may include information concerning an image capturing point. This allows the vehicle 20 to perform image capturing from the current position using the image capturing unit 255 that can perform image capturing in the direction of the image capturing point. Alternatively, the vehicle 20 can make a notification so that the driver of the vehicle 20 heads to the image capturing point.

In another example, the image capturing instruction may include information for designating which of the image capturing units 255 of the vehicle 20 is to be used. This allows the vehicle 20 to provide image capturing data desired by the user by performing image capturing by the image capturing unit 255 that should be used, even if the plurality of image capturing units 255 are provided. In one example, the image capturing instruction may include information for designating a type of image capturing data desired by the user, such as "360° panorama" or "moving image".

For example, the communication path instruction includes information for instructing, to the vehicle 20, an NW IF to be used, such as the identifier of one of the WLAN NW IF 256 and the cellular NW IF 257. The communication path instruction may include information for instructing an identifier (SSID) and type (cellular, WLAN, or the like) of a network formed by the AP 40. The communication path instruction may include information for designating the address of a node such as a next hop or gateway on a communication path. Furthermore, the communication path instruction may include information indicating whether to permit the use of the cellular network.

Note that if both the NW IF 256 and the cellular NW IF 257 can be used, the communication server 10 according to this embodiment controls the vehicle 20 to preferentially use the WLAN NW IF 256. This can offload the traffic to the WLAN NW whose communication cost per unit amount is lower than that of the cellular NW, thereby inexpensively implementing the image data providing service according to this embodiment.

Subsequently, the vehicle 20 acquires image capturing data using the image capturing unit 255 in response to reception of the image capturing instruction in S409 (S410). As described above, if the image capturing instruction received in S409 includes information for designating an image capturing unit to be used for image capturing, the vehicle 20 may acquire image capturing data using the designated image capturing unit 255.

If image capturing data like "360° panorama" is acquired in S410, one image capturing data may be generated by image processing based on a plurality of acquired image capturing data.

Subsequently, the vehicle 20 transmits the image capturing data acquired in S410 to the communication server 10 by the communication path determined based on the communication path instruction received in S409 (S411 and S412).

Note that if it is designated to use the WLAN NW IF 256 and if the vehicle 20 has not been connected to the AP 40 of the WLAN NW yet or the vehicle 20 has failed to transmit the image capturing data, the vehicle 20 stands by for transmission of the image capturing data for a predetermined time, and then attempts retransmission. Alternatively, if it is designated to use the cellular NW IF 257 and the vehicle 20 has failed to transmit the image capturing data, the vehicle 20 stands by for transmission of the image capturing data for a predetermined time, and then attempts retransmission. Note that the standby time until an attempt is made to perform retransmission when transmission of the image capturing data via the WLAN NW IF 256 fails may be longer than that until an attempt is made to perform retransmission when transmission of the image capturing data via the cellular NW IF 257 fails. This can avoid retransmission from being repeated unnecessarily when, for example, transmission via the WLAN NW IF 256 fails because the distance between the AP 40 and the vehicle 20 becomes longer.

Subsequently, the communication server 10 performs predetermined image processing for the image capturing data received in S412 to generate image data (S413). For example, the communication server 10 performs image recognition for the image capturing data to perform masking processing such as mosaicing or blurring for a person included in the image capturing data or perform masking processing such as mosaicing or blurring for the license plate of another vehicle included in the image capturing data.

In S413, the image capturing data may be added with information. For example, information concerning a point such as a store and included in the image capturing data may be included, as an AR tag, in the image data.

In FIG. 5, 500 shows image capturing data and 550 shows an example of image data generated based on 500. A passer 501 included in the image capturing data shown in 500 of FIG. 5 is blurred, as indicated by 551 in 550 of FIG. 5, and is processed so a user who browses the image data cannot specify the passer 501. In addition to the passer, the nameplate of a house and the like may be blurred. A store 502 in 500 of FIG. 5 is added with an AR tag such as an advertisement or information of the point, as indicated by 552 in 550 of FIG. 5. This allows the communication system 1 to provide the image data while protecting the privacy of the passer or another vehicle. Furthermore, since the communication system 1 can distribute an advertisement in association with a point which the user is interested in, it is possible to obtain a high advertisement effect. Note that the image data may be added with additional information 553 concerning an image capturing time and an image capturing point.

Subsequently, the communication server 10 transmits the image data generated in S410 to the user apparatus 30 which has transmitted the request of image data (S414 and S415). Upon receiving the image data in S415, the user apparatus 30 displays the image data on a display unit to present the image data to the user.

Processing Procedure

Figure 6:
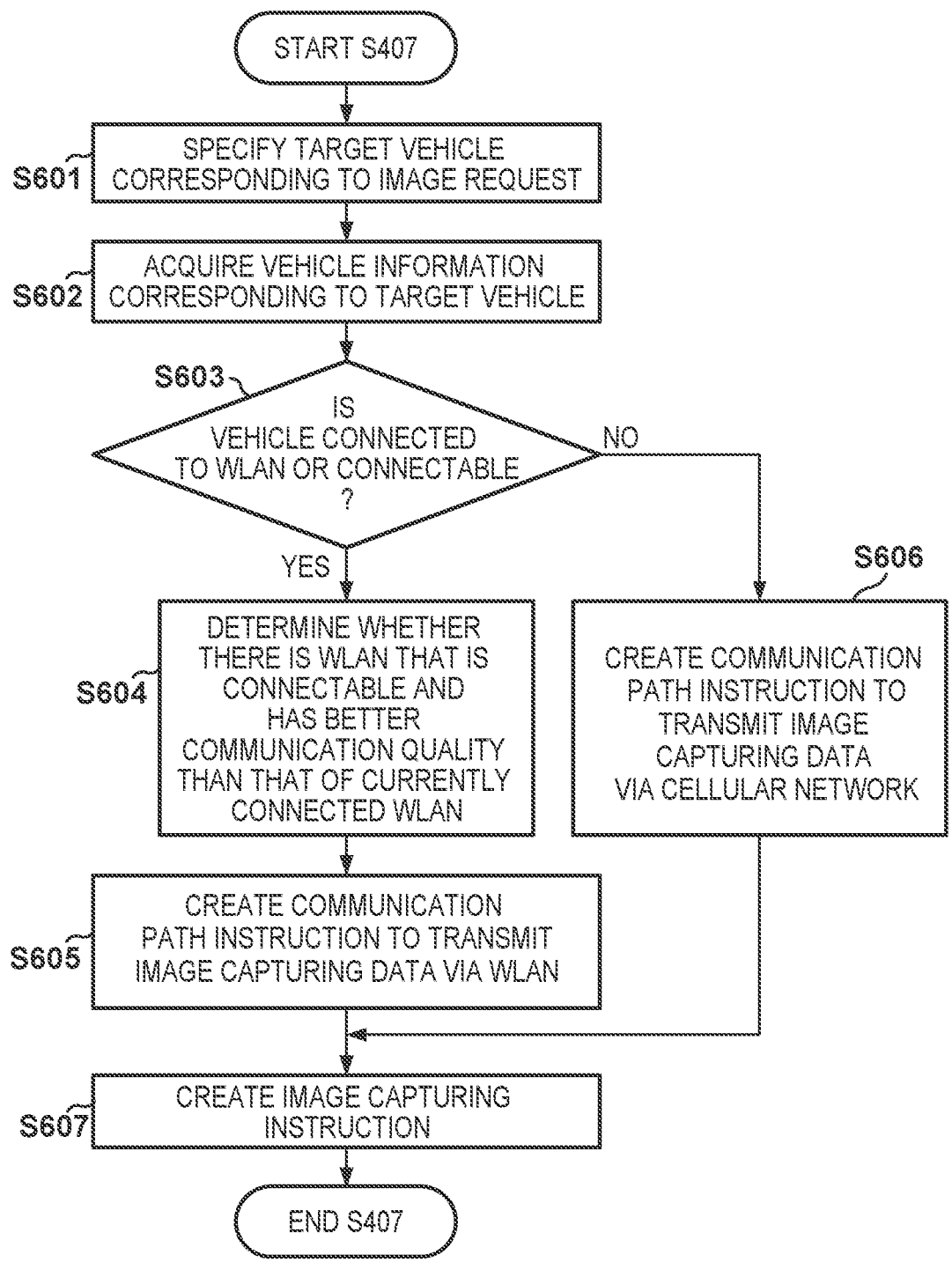
FIG. 6 is a flowchart illustrating an example of processing of the communication server according to the first embodiment.

An example of the processing in S407 in which the communication server 10 determines the vehicle 20 corresponding to the image request and a parameter concerning the communication path to be used by the vehicle 20 to transmit the image capturing data will be described next with reference to FIG. 6.

In step S601, the communication server 10 specifies the vehicle for transmitting the image capturing instruction, included in the image request. This embodiment assumes that the image request includes the identifier of the target vehicle. However, if the image request includes information of the image capturing target point, as described above, the vehicle information shown in FIG. 7B is acquired to specify the vehicle having position information close to the image capturing target point. Subsequently, the communication server 10 acquires vehicle information based on the identifier of the target vehicle specified in step S601 (S602).

Then, the communication server 10 acquires vehicle information corresponding to the vehicle for transmitting the image capturing instruction, and determines, based on communication path information included in the vehicle information, whether the vehicle 20 is currently connected to the WLAN or is connectable to the WLAN (S603). For example, if the communication path information of the vehicle 20 includes information indicating that the vehicle 20 is currently connected to the WiFi® network or the vehicle-to-vehicle communication network, the communication server 10 determines that the vehicle 20 is currently connected to the WLAN. Alternatively, if the communication path information of the vehicle 20 includes information concerning a connectable communication path, the communication server 10 determines that the vehicle 20 is connectable to the WLAN. Furthermore, if, among the relay vehicles 21 located within a predetermined communicable distance of vehicle-to-vehicle communication from the position of the vehicle 20, there is the relay vehicle 21 connected to the AP 40 via the multi-hop WLAN, the communication server 10 can determine that the vehicle 20 can be connected to the AP 40 by joining the multi-hop WLAN via the other vehicle 21. In this case, if there exists the relay vehicle 21 joining the multi-hop WLAN within the predetermined distance from the position of the vehicle 20, the communication server 10 may determine that the vehicle 20 is connectable to the WLAN.

If the vehicle is currently connected to the WLAN or is connectable to the WLAN (YES in step S603), the communication server 10 determines whether to switch the communication path (S604). More specifically, the communication server 10 determines whether, among WLANs connectable to the vehicle 20, there exists a WLAN with communication quality better than that of the currently connected WLAN. The communication quality is determined based on, for example, at least one of the reception signal intensity, packet error rate, transmission delay, and throughput. Then, the communication server 10 creates a communication path instruction to transmit the image capturing data via the WLAN (S605). Note that if there exists the currently connected local area network in step S604, the communication server 10 creates a communication path instruction to switch the communication path. This allows the communication server 10 to acquire the image capturing data from the vehicle 20 using the communication path with higher quality.

On the other hand, if the vehicle is not currently connected to the WLAN (NO in step S603), the communication server 10 creates a communication path instruction to transmit the image capturing data via the cellular network (S606). A description will be provided by assuming that the communication path instruction is information for designating a type of network such as "WLAN" or "cellular". Then, the communication server 10 creates an image capturing instruction (S607), and ends the processing in S407.

Note that this embodiment has explained the example of the processing in which the vehicle determines whether the WLAN is usable, and specifies, based on the determination, a parameter concerning a communication path to be used to transmit the image capturing data. However, in one example, if the communication server manages, as vehicle information, a list of APs connectable to the vehicle, a communication path instruction for designating a connection destination AP may be transmitted as a parameter concerning a communication path to be used to transmit the image capturing data. With this processing, if the vehicle 20 is not currently connected to the AP, and there exists a connectable AP in the periphery of the vehicle 20, the vehicle 20 can be made to be connected to the WLAN and to transmit the image capturing data to the communication server 10 via the WLAN. Even if the vehicle 20 is currently connected to the AP 40, it is possible to instruct the vehicle 20 to be connected to another connectable AP 40 with higher communication quality.

In one example, the communication server 10 may create a communication path instruction to a relay vehicle in addition to the vehicle 20 to relay the image capturing data from the vehicle 20 to another vehicle located in the periphery of the vehicle 20.

Note that this embodiment has explained the processing of specifying a communication path based on whether the vehicle is connected to the WLAN. In one example, however, the communication server 10 may specify a communication path based on the parameter of the connected WLAN. For example, the communication server 10 may determine, if the vehicle is currently connected to the WLAN with communication quality equal to or higher than a predetermined value, to transmit the image capturing data via the WLAN, and determine, if the communication quality of the connected WLAN is lower than the predetermined value, to transmit the image capturing data via the cellular network.

This embodiment assumes that the vehicle 20 acquires image capturing data only when an image capturing instruction is received from the communication server 10. However, the vehicle 20 may perform image capturing continuously or periodically, temporarily saves image capturing data within a predetermined period in the image capturing unit 255 or the HDD 254, and then transmit, when a communication path instruction is received from the communication server 10, the saved image capturing data to the communication server 10 using an instructed communication path. In this case, the communication server 10 may transmit only the communication path instruction and need not transmit the image capturing instruction.

Second Embodiment

The first embodiment has explained the processing of specifying, based on information concerning a network currently connected to a vehicle or a connectable network, a parameter concerning a communication path to be used by the vehicle to transmit image capturing data. The second embodiment will describe processing of specifying a parameter concerning a communication path based on information concerning a user who has transmitted a request of image data in addition to information concerning a network currently connected to a vehicle or a connectable network. Note that a description of the same components, processes, and functions as in the first embodiment will be omitted.

Figure 8:
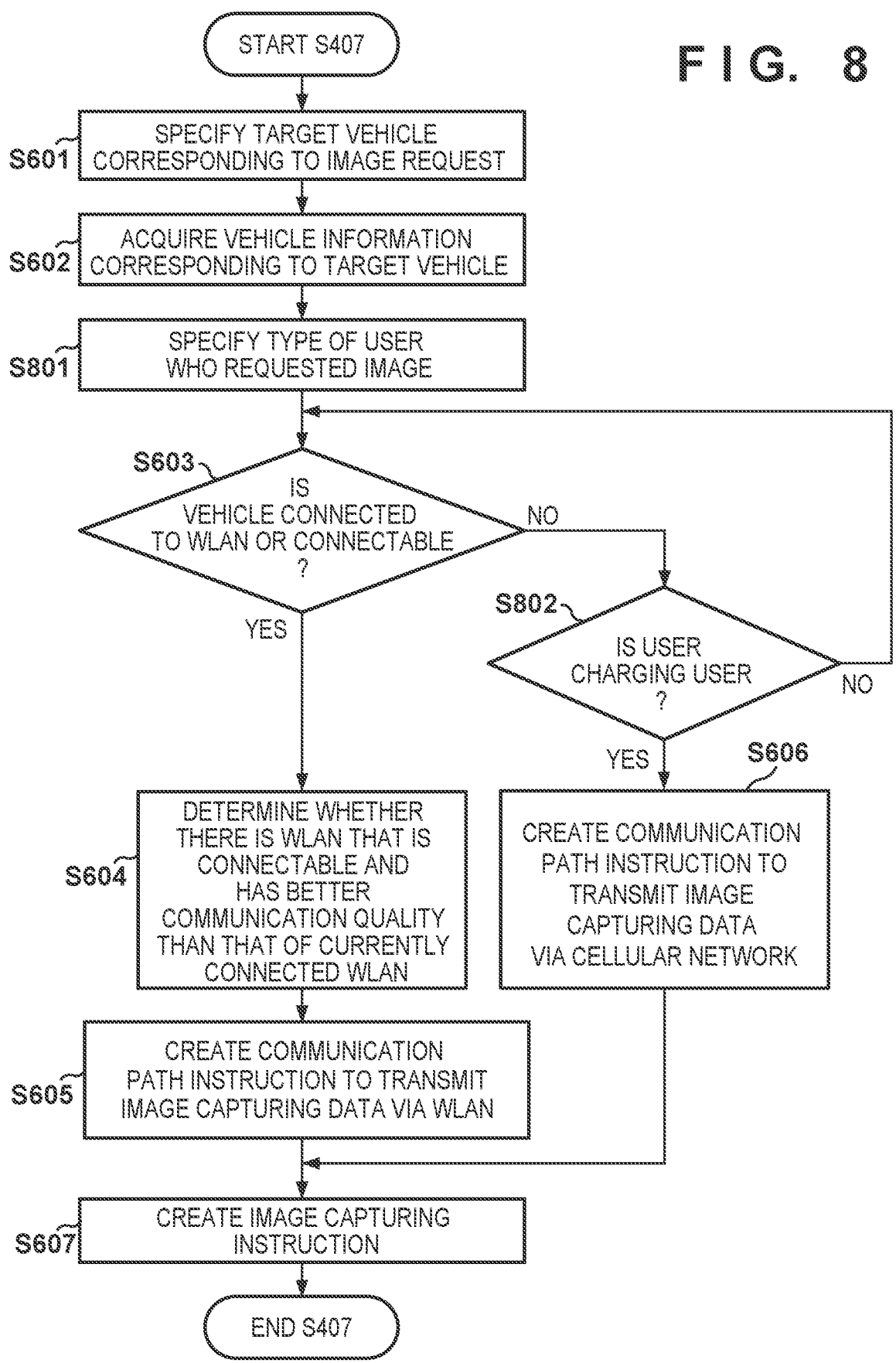
FIG. 8 is a flowchart illustrating an example of processing of a communication server according to the second embodiment.

With reference to FIG. 8, an example of processing in S407 in which a communication server 10 according to the second embodiment determines a vehicle 20 corresponding to an image request and a parameter concerning a communication path to be used by the vehicle 20 to transmit image capturing data will be described.

Processes in steps S601 and S602 are the same as in the first embodiment and a description thereof will be omitted. After step S602, the communication server 10 acquires user information concerning the user who has transmitted a request of image data, and specifies the type of the user (S801). This example assumes that the request of image data includes a user identifier, and the communication server 10 acquires a user type 702 included in user information 700 shown in FIG. 7A based on the user identifier.

Subsequently, if the vehicle is not currently connected to an AP (NO in step S603), the communication server 10 determines whether the user type of the user who requests the image data is a charging user (S802). If the type of the user who requests the image data is a charging user (YES in step S802), the communication server 10 advances the process to step S605; otherwise (NO in step S802), the communication server 10 stands by for a predetermined time, and then returns the process to step S603. With this processing, if the user is a charging user and the user can bear the communication cost when the vehicle 20 transmits image capturing data, it is possible to make the vehicle 20 transmit the image capturing data using the cellular network, thereby providing the image data with a low delay. On the other hand, if the user is a non-charging user or the like, it is possible to suppress the communication cost when acquiring image capturing data by not transmitting an image capturing instruction before the vehicle is connected to the AP.

Third Embodiment

The third embodiment will describe processing of a communication server for specifying, based on information concerning the planned moving path of a vehicle, a parameter concerning a communication path to be used by the vehicle to transmit image capturing data. Note that a description of the same components, processes, and functions as in the first and second embodiments will be omitted.

A vehicle 20 according to this embodiment acquires information concerning the planned moving path of the vehicle 20 in, for example, S401 of FIG. 4. This embodiment assumes that the information concerning the planned moving path is navigation data to a destination, which includes position information of right- and left-turning points. Upon acquiring the information concerning the planned moving path of the vehicle 20, a communication server 10 causes a vehicle information management module 305 to store, as vehicle information, the information concerning the planned moving path in a storage unit.

The communication server 10 according to this embodiment includes an AP information management module. The AP information management module stores information including the identifier of an AP and a point at which the AP is installed in association with each other.

Figure 9:
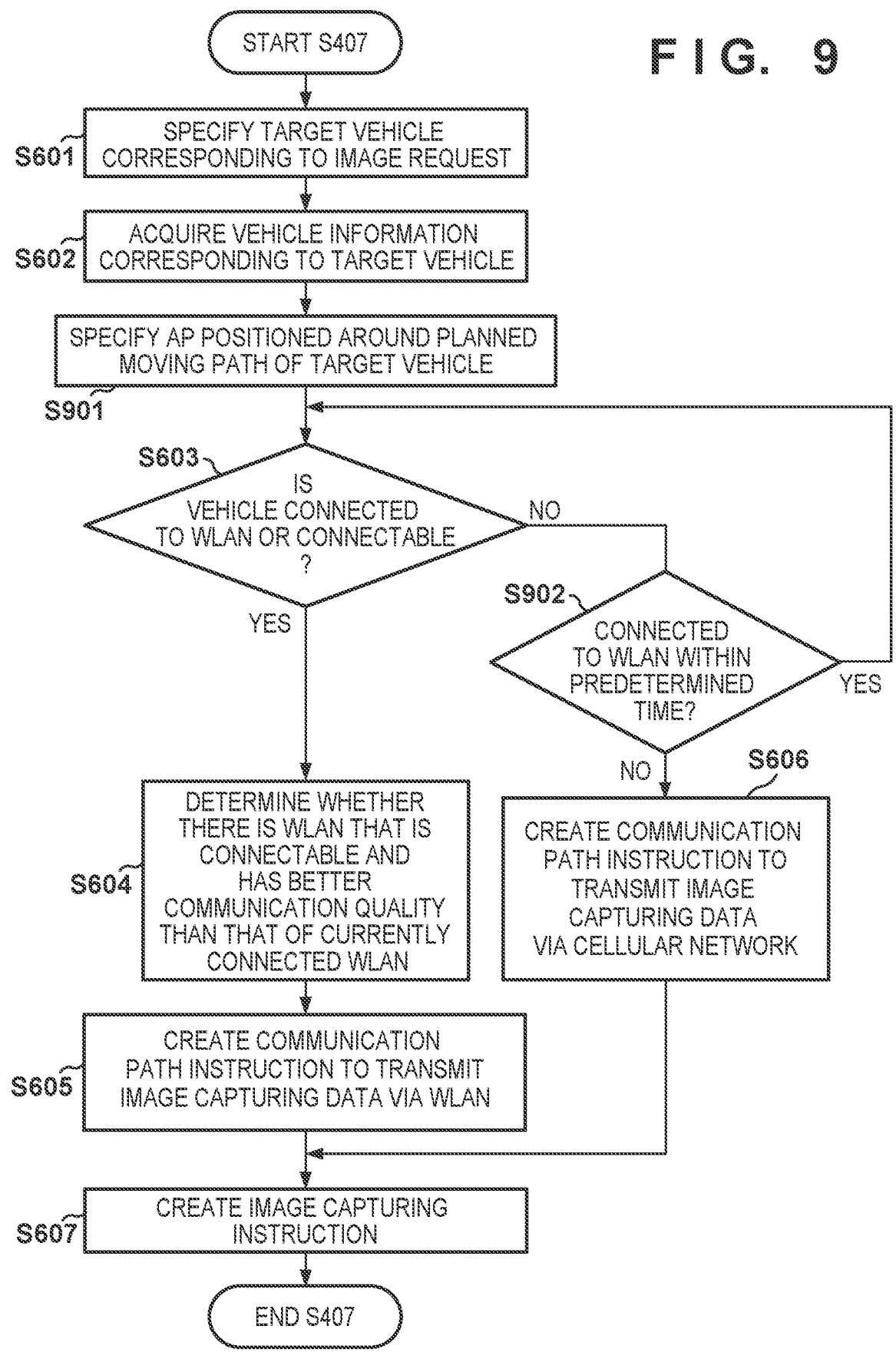
FIG. 9 is a flowchart illustrating an example of processing of a communication server according to the third embodiment.

Details of processing in S407 executed by the communication server 10 according to this embodiment will now be described with reference to FIG. 9. Processes in steps S601 and S602 are the same as in the first and second embodiments and a description thereof will be omitted.

After step S602, the communication server 10 specifies, based on the planned moving path of a target vehicle and position information of the target vehicle acquired in step S602, a planned moving path which the target vehicle is expected to reach within a predetermined time. Subsequently, the communication server 10 specifies an AP whose distance from the planned moving path becomes equal to or shorter than a predetermined value within a predetermined time.

For example, based on the planned moving path of the target vehicle and the current position of the target vehicle, the communication server 10 specifies a range which the target vehicle is expected to reach within the predetermined time when it travels on the planned moving path at a predetermined vehicle speed. Subsequently, by specifying an AP whose distance from the range is equal to or shorter than the predetermined value (for example, 20 m or less), for example, it is possible to determine whether the vehicle is highly probably connected to the WLAN within one minute if the vehicle travels on the planned traveling path at, for example, 40 km/h.

Subsequently, the communication server 10 advances the process to step S603. If the vehicle is not currently connected to the WLAN (NO in step S603), the communication server 10 advances the process to step S902, and determines whether a connectable AP is successfully specified within the predetermined time, that is, an AP is successfully specified in step S901. If it is determined that there is an AP which is expected to be located within the predetermined distance within the predetermined time (YES in step S902), the communication server 10 stands by for the predetermined time, and returns the process to step S603. With this processing, even if the vehicle is not currently connected to the WLAN, the communication server 10 can determine that the vehicle 20 highly probably moves to a point at which it is connectable to an AP 40 after standing by for the predetermined time, and can stand by for the predetermined time. Note that if it is determined that the vehicle is highly probably connected to the WLAN before the predetermined time elapses (YES in step S902), the communication server 10 may transmit information concerning the connection target AP 40 to the vehicle 20 before returning the process to step S603.

If it is determined that the vehicle is not connected to the WLAN within the predetermined time (NO in step S902), the communication server 10 creates a communication path instruction to instruct the vehicle 20 to transmit image capturing data via the cellular network (S606). Subsequent processing is the same as in the first embodiment and a description thereof will be omitted.

As described above, the communication server according to this embodiment transmits, based on information concerning the planned moving path of the vehicle and information concerning the position information of the AP, an instruction concerning a communication path to be used by the vehicle to transmit image capturing data to the communication server. Thus, if the vehicle can be connected to the WLAN within the predetermined time, by standing by for the predetermined time, it is possible to improve the possibility of offloading to the WLAN while providing image data to the user within a predetermined time.

Note that when transmitting an instruction concerning a communication path to be used by the vehicle to transmit image capturing data to the communication server, the communication server 10 according to this embodiment may instruct another vehicle located in the periphery of the vehicle to set the communication path. For example, if the distance from the AP to the vehicle is long and the vehicle cannot be connected to the AP by one hop, the communication server 10 may instruct another vehicle to relay communication between the AP and the vehicle. For example, an instruction to another vehicle may be an instruction to join the multi-hop WLAN. This makes it possible to form the multi-hop WLAN by the AP, the vehicle, and the other vehicle even if there is no AP directly connectable from the vehicle in the periphery of the vehicle, thereby improving the possibility that the vehicle can transmit image capturing data to the communication server without using the cellular network.

Other Embodiments

The invention is not limited to the foregoing embodiments, and various variations/changes are possible within the spirit of the invention.

For example, the first to third embodiments assume that the communication server generates image data based on image capturing data. However, in one example, the vehicle may generate image data based on image capturing data. In this case, the vehicle recognizes a person in the image capturing data by an image processing technique, protects privacy by mosaic processing or the like, and transmits image data to the communication server, and then the communication server adds an AR tag to the image data. In this way, the vehicle and the communication server may generate image data in cooperation with each other.

Furthermore, for example, the first to third embodiments assume that the communication server specifies a communication path to be used by the vehicle to transmit image capturing data to the communication server. However, in one example, the vehicle and the communication server may specify, in cooperation with each other, a communication path to be used by the vehicle to transmit image capturing data to the communication server. For example, path information transmitted from the communication server 10 to the vehicle 20 may be information indicating whether to permit the vehicle 20 to use the cellular network. In this case, the vehicle 20 may specify which of the cellular network and the WLAN is to be used.

The path information may be information for explicitly designating a communication path, or information capable of explicitly specifying a communication path such as information indicating whether the user who has requested the image data is a charging user or a non-charging user. A communication path to be used by the vehicle 20 may be determined in accordance with the status of the currently connected network. For example, if the path information received from the communication server 10 is information indicating that the user who has requested the image data is a charging user, it may be determined that the vehicle 20 can use any one of the WLAN NW IF 256 and the cellular NW IF 257, and if the path information is information indicating that the user who has requested the image data is a non-charging user, it may be determined that the vehicle 20 uses only the WLAN NW IF 256.

This embodiment assumes that the vehicle transmits image capturing data to the communication server 10 as a destination. However, in one example, image capturing data may be transmitted to the communication server 10 by repeating transfer of the image capturing data by a plurality of vehicles like DTN (Delay Tolerance Network). If, for example, the vehicle is not connectable to the WLAN, the communication server 10 may transmit a communication path instruction to the vehicle 20 and another vehicle, and instruct to form an ad hoc network and transmit image capturing data from the vehicle 20 to the other vehicle. In this case, the other vehicle can store the image capturing data received from the vehicle 20, can be connected to the WLAN after the predetermined time elapses, and can then transmit the received image capturing data to the communication server 10. This can cause the other vehicle connected to the WLAN to transfer the image capturing data within the predetermined time even if the vehicle 20 is not connectable to the WLAN and cannot be connected to the WLAN even after the predetermined time elapses.

That is, at least one of the functions of the communication server 10 may be implemented by the vehicle 20.

Furthermore, for example, the first to third embodiments assume that the vehicle 20 is connected to the WLAN such as Wi-Fi as a local area network. However, as described above, the local area network may be a multi-hop wireless local area network (multi-hop WLAN). In this case, the communication path information transmitted from the communication server 10 to the vehicle 20 may include the identifier of the multi-hop WLAN or the identifier of a node in the multi-hop WLAN. Furthermore, if the local area network is a multi-hop wireless local area network (multi-hop WLAN), the communication server 10 may determine, based on the planned moving path of another vehicle in addition to the planned moving path of the vehicle, a communication path to be used by the vehicle to transmit image capturing data to the communication server 10. This allows the communication server 10 to determine whether the vehicle 20 is disconnected from the multi-hop WLAN within the predetermined time, and accurately determine the possibility of implementing transmission of the image capturing data in the WLAN.

Summary of Embodiments

1. An information processing apparatus according to the above embodiment comprises
reception unit for receiving a request of image data from an external terminal,
first specifying unit for specifying, based on the request, a vehicle that provides image capturing data to generate the image data,
second specifying unit for specifying a parameter concerning a communication path to be used by the vehicle specified by the first specifying unit to transmit the image capturing data to the information processing apparatus, and
transmission unit for transmitting the parameter specified by the second specifying unit to the vehicle specified by the first specifying unit.

This can set the communication path to be used by the vehicle to transmit the image capturing data to the information processing apparatus.

2. The information processing apparatus according to the above embodiment further comprises first acquisition unit for acquiring network information concerning at least one of a network currently connected to the vehicle and a connectable network, and
the second specifying unit specifies the parameter based on the network information acquired by the first acquisition unit.

This allows the information processing apparatus to set, based on the information concerning the network currently connected to the vehicle, the communication path to be used by the vehicle to transmit the image capturing data to the information processing apparatus.

3. In the information processing apparatus according to the above embodiment, the network information includes information indicating communication quality between the vehicle and one node joining at least one of the network currently connected to the vehicle and the connectable network.

This allows the information processing apparatus to set, based on the communication quality between the vehicle and one node in the network currently connected to the vehicle, the communication path to be used by the vehicle to transmit the image capturing data to the information processing apparatus.

4. The information processing apparatus according to the above embodiment further comprises second acquisition unit for acquiring a list of access points connectable to the vehicle, and
the second specifying unit determines which of the access points included in the list is to be connected.

Therefore, when the vehicle is connectable to a plurality of access points, the information processing apparatus can set which of the access points is to be connected to the vehicle to transmit the image capturing data to the information processing apparatus.

5. The information processing apparatus according to the above embodiment further comprises third acquisition unit for acquiring information concerning a moving path of the vehicle and information concerning access points located in a periphery of the moving path of the vehicle, and the second specifying unit determines, based on the information concerning the moving path of the vehicle, which of the access points located in the periphery of the moving path of the vehicle is to be connected before a predetermined time elapses.

Therefore, even if the vehicle is not connectable to an access point at a given point of time, the information processing apparatus can set which of the access points, that become connectable before the predetermined time elapses, is to be connected to the vehicle to transmit the image capturing data to the information processing apparatus.

6. In the information processing apparatus according to the above embodiment,
the third acquisition unit further acquires information concerning a moving path of another vehicle located within a predetermined distance from the vehicle, and
the second specifying unit specifies the parameter further based on the information concerning the moving path of the other vehicle.

This allows the information processing apparatus to flexibly set a multi-hop WLAN based on the information concerning the moving paths of the vehicle and the other vehicle.

7. In the information processing apparatus according to the above embodiment,
the request includes account information of a user who requests the image data, and
the parameter is specified based on a type of a user account corresponding to the request.

This allows the information processing apparatus to set, in accordance with the account of the user who requests the image data, which of the access points is to be connected to the vehicle to transmit the image capturing data to the information processing apparatus.

8. In the information processing apparatus according to the above embodiment, if a cellular network is usable as the communication path to be used by the vehicle to transmit the image capturing data and another network different from the cellular network is not usable, the second specifying unit
specifies to transmit the image capturing data using the cellular network if the user account corresponding to the request is of a first type, and
transmits no image capturing instruction to the vehicle if the user account corresponding to the request is of a second type different from the first type.

This can respond to the request from the user account that desires to use the cellular network to transmit the image capturing data while suppressing the traffic load of the cellular network.

9. In the information processing apparatus according to the above embodiment, the parameter concerning the communication path includes information indicating whether to permit use of a cellular network.

This allows the information processing apparatus to notify the vehicle of whether to permit the vehicle to use the cellular network to transmit the image capturing data to the information processing apparatus.

10. In the information processing apparatus according to the above embodiment, the parameter concerning the communication path includes information indicating a type of a network to be used by the vehicle to transmit the image capturing data to the information processing apparatus.

This can notify the vehicle of which type of network is to be used by the vehicle to transmit the image capturing data to the information processing apparatus.

11. In the information processing apparatus according to the above embodiment, the parameter concerning the communication path includes information indicating an identifier of a network to be used by the vehicle to transmit the image capturing data to the information processing apparatus.

This can notify the vehicle of which of the networks is to be used by the vehicle to transmit the image capturing data to the information processing apparatus.

12. In the information processing apparatus according to the above embodiment, if a cellular network and another network different from the cellular network are usable, the second specifying unit specifies a parameter concerning the other network as the communication path to be used by the vehicle to transmit the image capturing data.

This can suppress the traffic load of the cellular network.

13. The information processing apparatus according to the above embodiment further comprises generation unit for generating the image data based on the image capturing data received from the vehicle.

This allows the information processing apparatus to provide the image data.

14. In the information processing apparatus according to the above embodiment, the generation unit generates the image data by performing mosaic processing for at least one of a face of a person and a license plate of another vehicle included in the image capturing data.

This allows the information processing apparatus to provide the image data from which information necessary to be protected in terms of privacy, such as the face of the person or the license plate of the other vehicle, has been deleted.

15. In the information processing apparatus according to the above embodiment, the generation unit generates the image data by adding an AR tag associated with a predetermined point in a periphery of the vehicle.

This allows the information processing apparatus to provide the image data added with advertisement information, information concerning a specific point, or the like.

16. In the information processing apparatus according to the above embodiment, the transmission unit transmits, to another vehicle different from the vehicle, information concerning the communication path to be used to transfer the image capturing data.

This allows the information processing apparatus to transmit an instruction to the other vehicle to form the communication path to be used by the vehicle to transmit the image capturing data to the information processing apparatus.

17. In the information processing apparatus according to the above embodiment, the transmission unit transmits, to another vehicle different from the vehicle, a signal for instructing to join a predetermined multi-hop network.

This allows the information processing apparatus to transmit an instruction to the other vehicle to form the multi-hop network to be used by the vehicle to transmit the image capturing data to the information processing apparatus.

18. An information processing method according to the above embodiment is an information processing method for an information processing apparatus, comprising:
receiving a request of image data from an external terminal;
specifying, based on the request, a vehicle that provides image capturing data to generate the image data;
specifying a parameter concerning a communication path to be used by the specified vehicle to transmit the image capturing data to the information processing apparatus; and transmitting the specified parameter and an image capturing instruction to the specified vehicle.

This can set the communication path to be used by the vehicle to transmit the image capturing data to the information processing apparatus.

19. A program according to the above embodiment causes a computer to operate as an information processing apparatus defined in any one of 1 to 17 described above.

This can set the communication path to be used by the vehicle to transmit the image capturing data to the information processing apparatus.

What is claimed is:

1. An information processing apparatus communicating with one or more vehicle via a network and the information processing apparatus being located outside of the at least one vehicle, the information processing apparatus executing an information processing method comprising:
receiving a request of image data from an external terminal including information for determining a type of a user sending the request;
specifying, based on the request, a vehicle that provides image capturing data to generate the image data from the at least one vehicle and the type of the user sending the request;
specifying a parameter concerning a communication path to be used by the specified vehicle to transmit the image capturing data to the information processing apparatus;
if a cellular network and another wireless local area network (WLAN) are usable, transmitting, as the specified parameter, a parameter concerning the WLAN as the communication path to be used by the vehicle to transmit the image capturing data to the information processing apparatus;
if the other wireless local area network (WLAN) is not usable, the cellular network is usable, and the type of the user sending the request is a first type, transmitting, as the specified parameter, a parameter indicating the cellular network as the communication path to be used by the vehicle to transmit the image capturing data to the information processing apparatus; and
if the other wireless local area network (WLAN) is not usable, the cellular network is usable, and the type of the user sending the request is a second type, returning to specifying the parameter concerning the communication path after a predetermined time has elapsed, and
wherein the parameter concerning the communication path includes information indicating whether to permit use of a cellular network to transmit the image capturing data to the information processing apparatus.

2. The apparatus according to claim 1, wherein
the information processing method further comprises acquiring a list of access points connectable to the vehicle, and
the specifying the parameter includes determining which of the access points included in the list is to be connected.

3. The apparatus according to claim 1, wherein the parameter concerning the communication path includes information indicating a type of a network to be used by the vehicle to transmit the image capturing data to the information processing apparatus.

4. The apparatus according to claim 1, wherein the parameter concerning the communication path includes information indicating an identifier of a network to be used by the vehicle to transmit the image capturing data to the information processing apparatus.

5. The apparatus according to claim 1, wherein the information processing method further comprises generating the image data based on the image capturing data received from the vehicle.

6. The apparatus according to claim 1, wherein the generating the image data includes generating the image data by performing mosaic processing for at least one of a face of a person and a license plate of another vehicle included in the image capturing data.

7. The apparatus according to claim 1, wherein the generating the image data includes generating the image data by adding an AR tag associated with a predetermined point in a periphery of the vehicle.

8. A non-transitory computer-readable storage medium storing a program for causing a computer to operate as an information processing apparatus communicating with one or more vehicle via a network and locating outside of the one or more vehicle according to claim 1.

9. The apparatus according to claim 1, wherein
the request of image data includes information specifying a predetermined point, and
a vehicle located within a predetermine distance from the predetermined point is specified from the one or more vehicle as the vehicle that provides image capturing data to generate the image data.

10. The apparatus according to claim 1, wherein
the information processing method further comprises acquiring network information concerning at least one of a network currently connected to the vehicle and a connectable network, and
the specifying the parameter includes specifying the parameter based on the acquired network information.

11. The apparatus according to claim 10, wherein the network information includes information indicating communication quality between the vehicle and one node joining at least one of the network currently connected to the vehicle and the connectable network.

12. The apparatus according to claim 1, wherein the transmitting the specified parameter includes transmitting, to another vehicle different from the vehicle, information concerning the communication path to be used to transfer the image capturing data.

13. The apparatus according to claim 12, wherein the transmitting the specified parameter includes transmitting, to another vehicle different from the vehicle, a signal for instructing to join a predetermined multi-hop network.

14. An information processing method for an information processing apparatus communicating with one or more vehicle via a network and locating outside of the one or more vehicle, the information processing method comprising:
receiving a request of image data from an external terminal;
specifying, based on the request, a vehicle that provides image capturing data to generate the image data from the one or more vehicle;
specifying a parameter concerning a communication path to be used by the specified vehicle to transmit the image capturing data to the information processing apparatus;
if a cellular network and another wireless local area network (WLAN) are usable, transmitting, as the specified parameter, a parameter concerning the WLAN as the communication path to be used by the vehicle to transmit the image capturing data to the information processing apparatus;
if the other wireless local area network (WLAN) is not usable, the cellular network is usable, and the type of the user sending the request is a first type, transmitting, as the specified parameter, a parameter indicating the cellular network as the communication path to be used by the vehicle to transmit the image capturing data to the information processing apparatus; and
if the other wireless local area network (WLAN) is not usable, the cellular network is usable, and the type of the user sending the request is a second type, returning to specifying the parameter concerning the communication path after a predetermined time has elapsed, and
wherein the parameter concerning the communication path includes information indicating whether to permit use of a cellular network to transmit the image capturing data to the information processing apparatus.

* * * * *